United States Patent
Albrecht

(10) Patent No.: US 7,675,699 B2
(45) Date of Patent: *Mar. 9, 2010

(54) PATTERNED-MEDIA MAGNETIC RECORDING DISK AND DISK DRIVE WITH DATA ZONES HAVING NONDATA REGIONS NEAR THE ZONE BOUNDARIES

(75) Inventor: Thomas R. Albrecht, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 291 days.

This patent is subject to a terminal disclaimer.

(21) Appl. No.: 11/852,252

(22) Filed: Sep. 7, 2007

(65) Prior Publication Data

US 2009/0067082 A1    Mar. 12, 2009

(51) Int. Cl.
G11B 5/09 (2006.01)
(52) U.S. Cl. .................. 360/48; 428/848.5; 360/51
(58) Field of Classification Search .................. None
See application file for complete search history.

(56) References Cited

U.S. PATENT DOCUMENTS 6,738,207 B1 *   5/2004   Belser et al. ............... 360/31
6,754,017 B2 *   6/2004   Rettner et al. ............. 360/51
6,937,421 B2     8/2005   Rubin et al.
7,133,229 B2    11/2006   Semba
2006/0092541 A1  5/2006   Moser
2008/0304173 A1* 12/2008  Albrecht et al. .......... 360/51

FOREIGN PATENT DOCUMENTS

JP   2003157631   5/2003
JP   2006079827   3/2006

* cited by examiner

Primary Examiner—Jason C Olson
(74) Attorney, Agent, or Firm—Thomas R. Berthold

(57) ABSTRACT

A patterned-media magnetic recording disk has data islands arranged into concentric data tracks and the data tracks arranged into radially-spaced annular zones, with each zone having an inside-diameter (ID) perimeter and an outside-diameter (OD) perimeter and at least one annular nondata region near one of its perimeters. Each zone includes generally radially-directed synchronization (sync) marks that extend from the zone ID perimeter to the zone OD perimeter so as to extend into the annular nondata region or regions of the zone. In the disk drive that uses the patterned-media disks the read head and write head have an effective radial offset relative to one another, so the write head may be on a data track near a zone perimeter when the read head is located in a nondata region. The read head detects the sync marks that extend into the nondata region so that the write head can be synchronized with the data islands in the data track.

19 Claims, 5 Drawing Sheets

PATTERNED-MEDIA MAGNETIC RECORDING DISK AND DISK DRIVE WITH DATA ZONES HAVING NONDATA REGIONS NEAR THE ZONE BOUNDARIES

BACKGROUND OF THE INVENTION

1. Field of the Invention

This invention relates generally to patterned magnetic recording disks with annular data zones, and to disk drives with such disks.

2. Description of the Related Art

Magnetic recording hard disk drives with patterned magnetic recording media have been proposed to increase data density. In a patterned-media disk the magnetic recording layer on the disk is patterned into small isolated data islands arranged in concentric data tracks. In zoned or banded recording, the data tracks are grouped into annular zones, wherein the spacing of the data islands within each zone is fixed at one particular angular frequency for each zone. The angular frequencies for the zones are chosen so that the along-the-track spacing, or linear pitch, is approximately equal in all zones. This results in zones near the outside diameter (OD) of the disk having a higher data rate than zones near the inside diameter (ID).

However, due to tolerances in fabrication of the read head and write head, there is both an along-the track physical spacing and a cross-track physical spacing between the read head and the write head. Also, the slider on which the read head and write head are fabricated is moved across the disk surface in a non-radial arcuate path, which results in "skew" of the read head and write head relative to the data tracks. As a result of the physical spacings and head skew, there is typically an effective radial offset between the read head and the write head so that the read head and write head are generally not on the same track simultaneously. This effective radial offset causes problem when writing to data tracks near the boundaries of the data zones because the read and write heads may be in different zones, and each zone requires a different write frequency.

What is needed is a patterned-media disk with data zones and a disk drive that uses such disks that addresses the problem of writing to data tracks near zone boundaries.

SUMMARY OF THE INVENTION

The invention relates to a patterned-media magnetic recording disk with annular data zones and a disk drive that uses such disks. The data islands are arranged into concentric tracks and the tracks are arranged into radially-spaced annular zones, with each zone having an inside-diameter (ID) perimeter and an outside-diameter (OD) perimeter and at least one annular nondata region near one of its perimeters. Each zone includes generally radially-directed synchronization (sync) marks that extend from the zone ID perimeter to the zone OD perimeter so as to extend into the annular nondata region or regions of the zone. The nondata regions may be patterned with islands like in the data tracks in the zone, but the disk drive is not capable of writing data to those islands. Alternatively, the nondata regions may be patterned to have no islands.

During operation of the disk drive, because the read head and write head have an effective radial offset as a result of their physical spacings and head skew, the write head may be on a data track near a zone perimeter but the read head is located in a nondata region. However, the read head can detect the sync marks that extend into the nondata region so that the write head can be synchronized with the data islands in the data track.

The radial dimension of an annular nondata region may be chosen based on the known effective radial offset of the read head and write head. The read head typically is offset from the write head toward either the ID-side or the OD-side of the disk, so the data zones can be designed to have only one annular nondata region, either at the ID perimeter or the OD perimeter, respectively.

For a fuller understanding of the nature and advantages of the present invention, reference should be made to the following detailed description taken together with the accompanying figures.

DETAILED DESCRIPTION OF THE INVENTION

Figure 1:
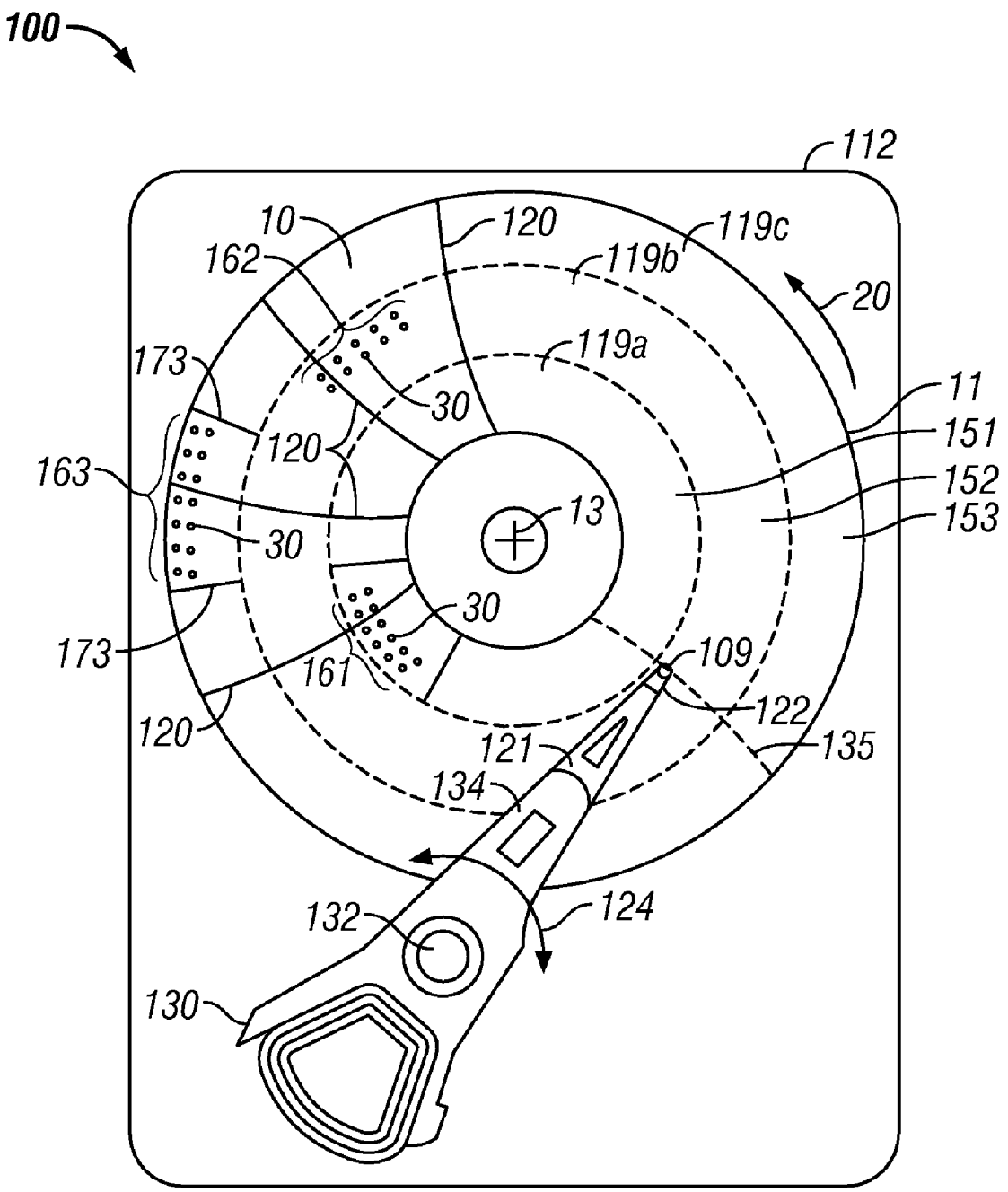
FIG. 1 is a top view of a patterned-media disk drive like that to which the present invention relates.

FIG. 1 is a top view of a patterned-media disk drive 100 like that to which the present invention relates. The drive 100 has a housing or base 112 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data blocks or islands 30 of magnetizable material on the substrate 11. The data islands 30 function as discrete magnetic bits for the storage of data and are arranged in radially-spaced circular tracks, with the tracks being grouped into annular bands or zones 151, 152, 153. Within each track, the data islands 30 are typically arranged in fixed-byte-length data sectors (e.g., 512 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical marks 173 in zone 153. Each sync mark 173 may be plurality of circumferentially-spaced marks, with the spacing being different in each zone, that are detected by the read head to enable the write head to be synchronized with the specific spacing of the data islands in that zone. The sync marks may be located in the sector headers for the data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
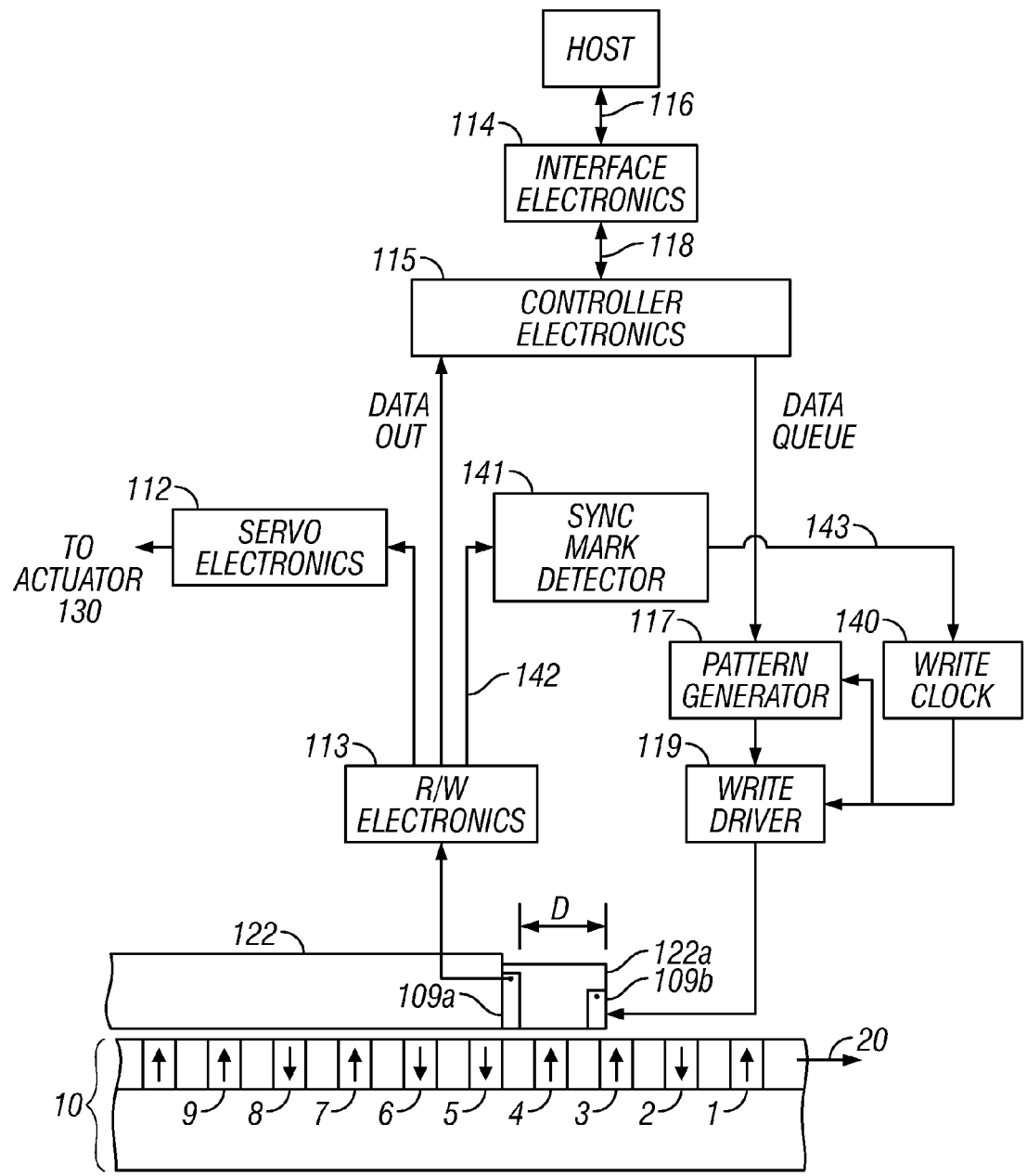
FIG. 2 is a block diagram of the electronics associated with the disk drive of the present invention and also shows a sectional view of the patterned magnetic recording disk.

FIG. 2 is a block diagram of the electronics associated with disk drive 100 and also shows a sectional view of the magnetic recording disk 10 with a magnetic recording layer of patterned media in the form of discrete magnetizable data islands or blocks 1-9. FIG. 2 also shows a portion of slider 122 with read/write head 109 that includes the read element or head 109a and the write element or head 109b. The read head 109a and write head 109b are formed on the trailing end 122a of slider 122. The arrows depicted in the blocks 1-9 represent the magnetic moments or magnetization directions in the blocks, and are depicted for perpendicular or out-of-plane magnetic recording. The recording or writing of data occurs by an inductive coil write head 109b that has a write pole that generates a magnetic field to magnetize the blocks in one of the two magnetization directions, depending on the direction of current through the coil of the write head. Because there is no magnetic material between the blocks 1-9, the write pulses must be precisely timed to magnetize the appropriate blocks. While FIG. 2 illustrates perpendicular patterned media, wherein the blocks 1-9 are depicted with their moments oriented out of the plane of the recording layer, the invention is fully applicable to horizontal or longitudinal patterned media, wherein the blocks 1-9 would have their moments oriented in the plane of the magnetic recording layer.

The disk drive electronics include read/write (R/W) electronics 113, servo electronics 112, controller electronics 115 and interface electronics 114. The R/W electronics 113 receives signals from read head 109a and passes servo information from the servo sectors 120 to servo electronics 112 and data signals from the data sectors to controller electronics 115. Servo electronics 112 typically includes a servo control processor that uses the servo information from the servo sectors 120 to run a control algorithm that produces a control signal. The control signal is converted to a current at that drives rotary actuator 130 to position the head 109. Interface electronics 114 communicates with a host system (not shown) over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 receives a list of requested data sectors from interface electronics 114 and converts them into a set of numbers that uniquely identify the disk surface (head number associated with that disk surface), track and data sector. The numbers are passed to servo electronics 112 to enable positioning head 109 to the appropriate data sector.

FIG. 2 also shows schematically the transfer of data between a host system, such as a PC, and the disk drive 100. The signals from recorded data blocks in the data sectors are detected by read head 109a, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates high-frequency current pulses to the coil of write head 109b which results in the magnetic write fields that magnetize the data blocks 1-9. The pattern generator 117 and write driver 119 are controlled by write clock 140. A sync mark detector 141 receives the readback signal from R/W electronics 113 on input line 142 and outputs a signal on line 143 to adjust the phase and frequency of write clock 140 to synchronize the write pulses to pattern generator 117 and write driver 119. The sync mark detector 141 detects the sync marks (like sync marks 173 in FIG. 1) from R/W electronics 113. The sync mark spacing in each zone is different so sync mark detector 141 enables the write clock 140 to be synchronized with the spacing of the data islands in each of the different zones.

As shown in FIG. 2, there is a physical spacing D in the circumferential or along-the-track direction between the read head 109a and the write head 109b. Also, due to tolerances in fabrication there is typically a radial or cross-track physical spacing between the read head 109a and write head 109b, with this radial spacing having a statistical variation among the heads in the same fabrication process. Also, the arcuate path 120 of the head 109 (FIG. 1) results in head "skew", which varies as a function of disk radius. As a result of the physical circumferential and radial spacings, and head skew, there is typically an effective radial offset between the read head 109a and the write head 109b, so that the read head and write head are generally not on the same track simultaneously. Conventional approaches exist for measuring the effective read head/write head radial offset in a disk drive and storing this information in the drive electronics for track-following control during reading and writing of data.

This effective radial offset between the read and write heads causes problem when writing to tracks at the zone boundaries because the read and write heads may be in different zones, and each zone requires a different write frequency. If there were no radial offset, the read and write heads would always be aligned on the same data track and the sync marks in each zone would be matched to the write clock frequency of that zone. For example, if the data islands in a particular zone have a spacing that corresponds to a frequency F, the sync marks for that zone may be a burst of islands with the same spacing and frequency F. Typically this may be implemented as a series of marks or stripes that cross all the tracks within that zone. However, this is not the only type of sync mark or synchronization method for patterned media with zoned recording. Any type of sync mark that can be recognized and distinguished from data, and whose position can be timed very accurately, can be used to set the frequency and phase of the write clock for a zone. By timing the interval from the sync mark in one data sector header (or servo sector) to the sync mark in the next data sector header (or servo sector), the frequency of the write clock can be set with great precision. By measuring the position of the sync mark in a sector very accurately, the phase of the write clock can be set very precisely. Measuring the position (timing) of the sync mark very accurately requires that it have a number of magnetic transitions within it (a complex waveform generated). A fixed-frequency burst is one way to accomplish this. While it is convenient if the frequency of features in the sync mark matches the frequency of islands in the data sector, it is not a requirement. Thus, as used herein a sync mark is any type of mark or feature or series of marks or features in a zone that can be detected by the read head to synchronize writing of data to the data islands in that zone.

Figure 3:
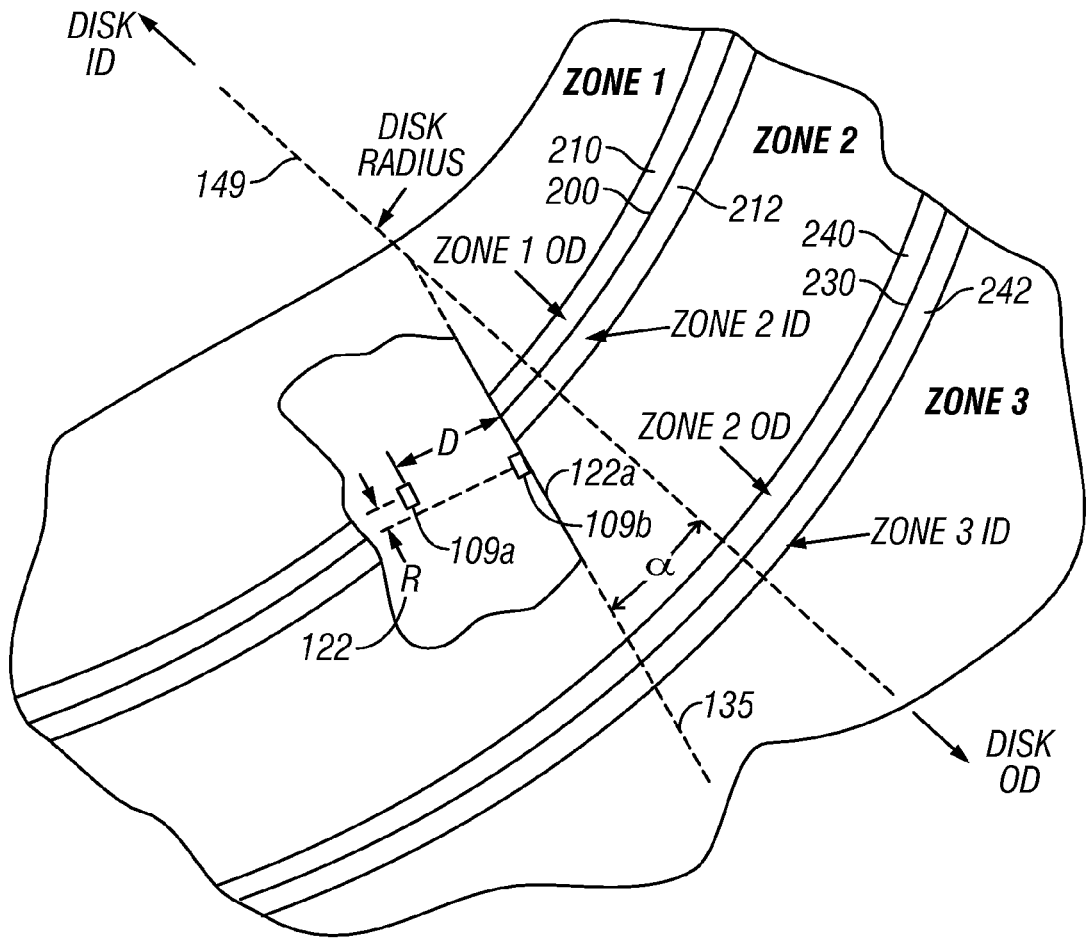
FIG. 3 is a schematic showing a portion of a disk with three data zones and a slider with spacings between the read head and write head.
Figure 4:
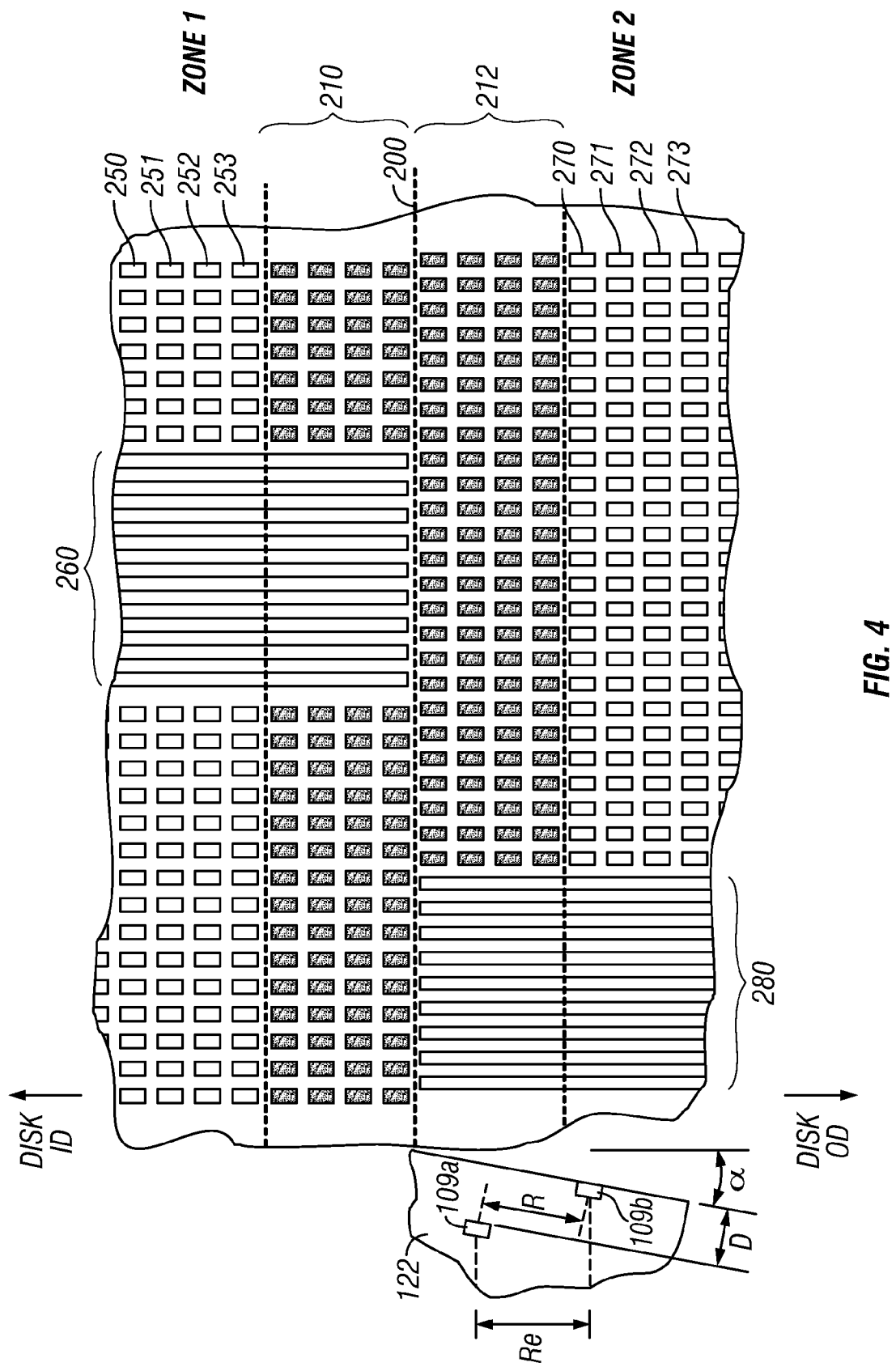
FIG. 4 is an enlarged view of a portion of FIG. 3 showing the boundary between two of the data zones.

This invention provides a patterned-media disk and disk drive that addresses the problem of writing to data tracks near the zone boundaries in a disk drive that exhibits read head/write head radial offsets. FIG. 3 is a schematic drawing (not to scale) illustrating this problem and shows slider 122 and three data zones of the disk, and FIG. 4 is an enlarged view of a portion of two of the zones. Zone 1 and Zone 2 have a zone boundary 200 and Zone 2 and Zone 3 have a zone boundary 230. Each zone boundary, like boundary 200, generally defines the perimeters of each zone, like the OD perimeter of Zone 1 and the ID perimeter of Zone 2. The slider 122 has a trailing end 122a with read head 109a and write head 109b separated by a physical circumferential spacing D and a physical radial spacing R. Because the slider 122 is mounted to rotary actuator 130 (FIG. 1) its path is an arcuate path 135 that is not aligned with the disk radius 149. As shown in FIG. 3, the end face 122a of slider 122 makes an angle α (called the skew angle) with the disk radius 149. As a result of D, R and α, near zone boundary 200 there is an effective radial offset $R_e$ between read head 109a and write head 109b such that the write head 109b may be in Zone 2 and the read head 109a may be in Zone 1. In a disk drive using patterned media with an areal density around 1 Terabit per square inch, the track pitch (the radial spacing between adjacent tracks) may be in the range of about 25 to 50 nm and the maximum skew angle α would be about 15 degrees. Manufacturing tolerances result in R being between +/−1 micron and D is about 8 microns. As a result, the maximum $R_e$ may be about 3 microns, or as much as 120 times the track pitch.

In the present invention, each zone may have annular nondata region near one or both of the zone's ID and OD regions. This is shown by Zone 1 nondata OD region 210, Zone 2 nondata ID region 212, Zone 2 nondata OD region 240, and Zone 3 nondata ID region 242. Each nondata region may be a non-patterned region with the absence of any tracks or islands. Alternatively, each nondata region may contain tracks with discrete islands, but the disk drive is not capable of writing data to those islands. The radial dimensions of the ID and OD nondata regions of each zone do not need to be equal. Additionally, nondata regions may not be needed in some zones.

In addition to the nondata regions at one or both of the ID and OD regions of each zone, in the present invention the sync marks extend into the annular nondata regions. The sync marks are detected by the read head to determine the frequency and phase of the zone so that the write head is synchronized with the data islands in that zone. Zone 1 includes data tracks 250-253, sync marks 260, and nondata OD region 210 near zone boundary 200. The nondata region 210 is shown as having a pattern of tracks with islands like in data tracks 250-253, but this region may also have no islands. The islands in the tracks of nondata region 210 are shown as shaded to represent that the disk drive is not capable of writing data to those islands. The sync marks 260 are generally radially-directed and cover the entire Zone 1, extending into the nondata region 210. Similarly, Zone 2 includes data tracks 270-273, sync marks 280, and nondata ID region 212 near zone boundary 200. The nondata region 212 is shown as having a pattern of tracks with islands like in data tracks 270-273, but this region may also have no islands. The islands in the tracks of nondata region 212 are shown as shaded to represent that the disk drive is not capable of writing data to those islands. The sync marks 280 are generally radially-directed and cover the entire Zone 2, extending into the nondata region 212. FIG. 4 also shows that the along-the-track spacing of the islands and the individual sync marks in Zone 1 are the same and the along-the-track spacing of the islands and the individual sync marks in Zone 2 are also the same, but the spacing in Zone 1 is different than in Zone 2. This is because the data rate, and thus the required write frequency, is different between the two zones.

The arrangement of annular nondata regions and sync marks as shown in FIG. 4 addresses the problem of the read head and write head not being aligned on the same data track. In the example depicted in FIG. 4, the read head 109a will detect sync marks 280, which are used in the disk drive electronics to synchronize writing by write head 109b in data track 270.

The radial extent or dimension of the nondata region, like Zone 2 ID region 212, can be selected during fabrication of the patterned disk, depending on the known maximum skew for that particular zone boundary and statistical knowledge of the distributions of read head/write head physical spacings known for the heads being used in the disk drive. Given the known head skew range that applies for a particular zone, worst case effective radial offsets (out to a particular statistical sigma value) at the ID and OD zone boundaries can be calculated. The nondata regions are then made large enough to accommodate these worst case effective radial offsets. Thus, in this approach the ID and OD nondata regions would have the same radial dimension. However, this statistical range of effective radial offsets might mean that for a particular zone, 10 microns of unused tracks may be needed on the ID side of the zone, and 15 microns need on the OD side. This is because skew can cause the offsets to be unequal even if the head physical spacings have a statistical mean of zero. Thus in the present invention a zone's ID nondata region may have a radial dimension different from the radial dimension of its OD nondata region.

Figure 5:
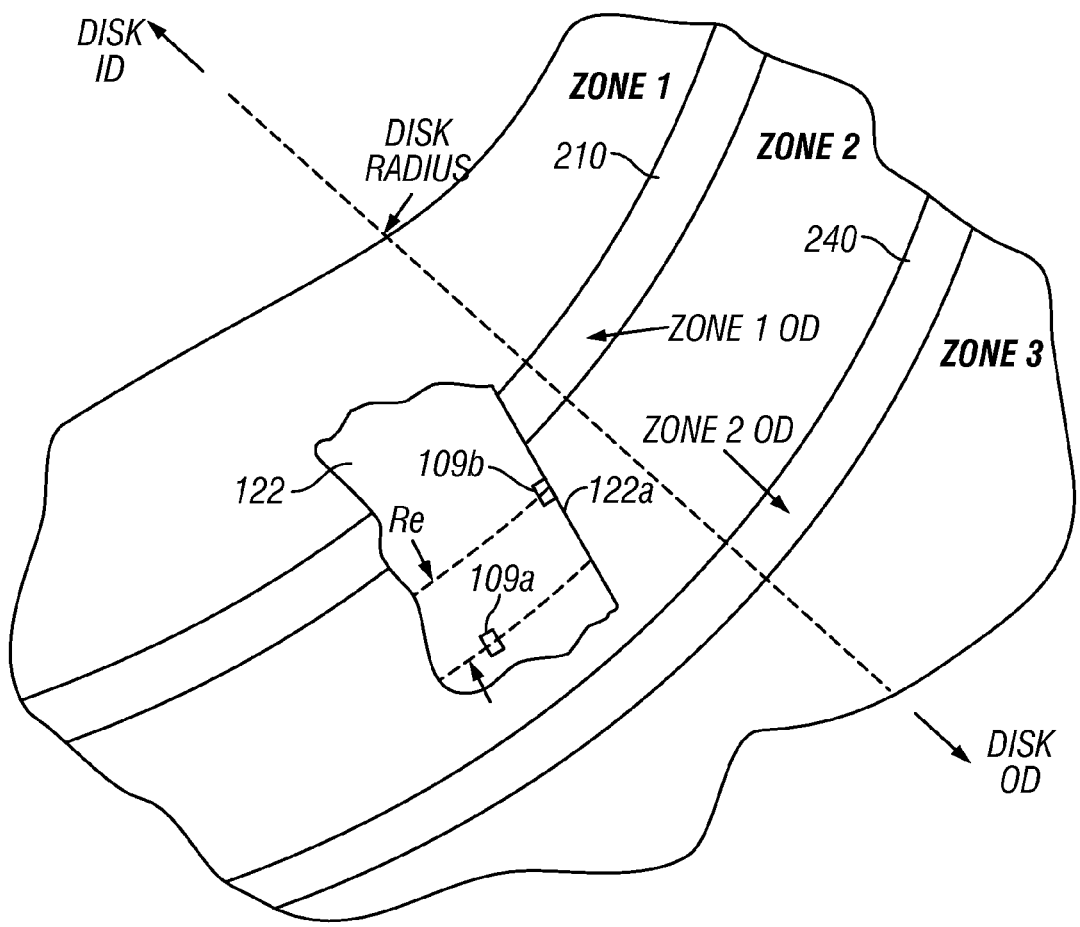
FIG. 5 is a schematic showing a portion of a disk with three data zones and a slider with spacings between the read head and write head, but with the read head spaced toward the outside diameter (OD) of a zone.

In the present invention, for any head-zone combination, a nondata region may be needed at either the zone ID side or the zone OD side, but not both. This is because a read/write head will have either a positive or negative effective radial offset between the read and write heads (measured radially with the skew that applies in that zone) at any given zone boundary. To implement this aspect of the invention, each zone includes enough extra tracks to accommodate the largest possible ID or OD region, but not both. During manufacturing of the disk drive, after the effective radial offset of the read/write head has been measured for each track (or zone), tracks are selected from within that zone such that there are a suitable number of extra tracks on either the ID or OD side of the zone to accommodate the offset. This is accomplished within the drive's control system by replacing the physical track number with a logical track number using an offset value stored in a permanent look-up table created during disk drive manufacturing. FIG. 3 shows an example where the read head 109a is to the ID side of the write head 109b on the slider 122. In this case, a nondata region is needed only on the ID side of each zone, so the data tracks of the zone are chosen to be on the OD side of the zone. Thus in FIG. 3, OD nondata regions 210 and 240 are not needed. This leaves the unused data tracks that would otherwise be in OD nondata regions 210, 240 available for data tracks. In the example of FIG. 3, the read head 109a would detect the sync marks in nondata region 212 to synchronize writing by write head 109b in the data tracks in Zone 2. Similarly, the read head 109a would detect the sync marks in nondata region 242 of Zone 3 to synchronize writing by write head 109b in the data tracks in Zone 3. FIG. 5 shows an example where the read head 109a is to the OD side of the write head 109b on the slider 122. In this case, a nondata region is needed only on the OD side of each zone, so the data tracks of the zone are chosen to be on the ID side of the zone. Thus in FIG. 5, only OD nondata regions 210 and 240 are needed. Thus when read head 109a is located in Zone 1 OD nondata region 210, it detects the sync marks in nondata region 210 and the write head 109b writes to the data tracks in Zone 1. Similarly, when read head 109a is located in Zone 2 OD nondata region 240, it detects the sync marks in nondata region 240 and the write head 109b writes to the data tracks in Zone 2.

For cases where the read and write heads are quite closely aligned on the slider, i.e, the effective radial offset $R_e$ is relatively small, the relative positions of the read and write heads relative to a zone boundary may be skew dependent and may change as the read/write head moves from a zone's ID to its OD. If the skew shown in FIGS. 3 and 5 is defined as positive skew (which typically applies in the OD zones of a disk drive), then a slider with well-aligned read and write heads would have the read head effectively positioned toward the ID side of the write head, necessitating ID-side nondata regions for OD zones. In the ID zones for the same slider, the read head would be effectively positioned toward the OD side of the write head, necessitating OD-side nondata regions for ID zones. If the write head is positioned behind the read head (i.e., the write head is fabricated on top of the read head, which is the conventional case), then for a slider with well-aligned read and write heads, one zone somewhere between the disk's ID and OD will not need to have a nondata region on either side, and the data tracks may be designated anywhere within the zone. If the order of the heads were reversed in fabrication, then one zone would need to have nondata regions on both sides. However, since this particular zone only needs small nondata regions on either side, there is enough space available within the zone to designate data tracks in the center of the zone.

In FIG. 4 the data islands are depicted as rectangular with a particular aspect ratio (radial height to circumferential width). However, the data islands may have other shapes, including circular and rectangular with other aspect ratios. Also, in FIG. 4 the data tracks are depicted with the data islands aligned generally radially across the tracks in a zone. However, it is known that the islands in each track may be shifted in the along-the-track direction by one-half the island spacing from the islands in adjacent tracks. In such an arrangement, any readback signal interference from an adjacent track will be out of phase with the readback signal from the track being read, which results in a substantially reduced error rate for the data being read.

In FIG. 4 the sync marks 260, 280 are depicted as sets of individual stripes or marks that extend radially across all the tracks in a zone. However, the sync marks may be separate features for each track, for example each stripe may be a dashed radial line broken between each track. The sync marks may also be islands that look like the data islands, except that they have a pattern which is permanently written once, and never rewritten during normal operation of the disk drive. Also, as described previously, the sync marks in a zone do not need to be a series of stripes or marks with the same spacing as the data islands in that zone. However, regardless of the form or pattern of the sync marks used for a zone, they should extend into at least one annular nondata region of the zone.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned-media magnetic recording disk comprising:
   a substrate;
   a plurality of discrete magnetizable data islands on the substrate, the islands being arranged into a plurality of concentric radially-spaced tracks and the tracks being arranged into a plurality of radially-spaced annular zones, each zone having an inside-diameter (ID) perimeter and an outside-diameter (OD) perimeter and at least one annular nondata region near one of its perimeters, said at least one annular nondata region in each zone having a radial dimension greater than four times the radial spacing between adjacent tracks; and
   sync marks in each zone and extending generally radially from the zone ID perimeter to the zone OD perimeter so as to extend into said at least one annular nondata region.

2. The disk according to claim 1 wherein each annular nondata region comprises a plurality of concentric tracks containing no data.

3. The disk according to claim 1 wherein there are no data tracks in each annular nondata region.

4. The disk according to claim 1 wherein each of the zones has a nondata region only near its ID perimeter.

5. The disk according to claim 1 wherein each of the zones has a nondata region only near its OD perimeter.

6. The disk according to claim 1 wherein the data islands in each track of a zone are generally equally angularly spaced and wherein each sync mark in a zone comprises a set of generally radially directed marks that have substantially the same angular spacing as the data islands in that zone.

7. A patterned-media magnetic recording disk drive comprising:
   a rotatable magnetic recording disk having a plurality of discrete magnetizable data islands, the islands being arranged into a plurality of concentric tracks and the tracks being arranged into a plurality of radially-spaced annular zones, each zone having an inside-diameter (ID) perimeter and an outside-diameter (OD) perimeter and at least one annular nondata region near one of its perimeters, and sync marks in each zone and extending generally radially from the zone ID perimeter to the zone OD perimeter so as to extend into said at least one annular nondata region;

a read head for reading data from the data islands;

a write head for writing data to the data islands;

carrier supporting the read head and write head; and a rotary actuator attached to the carrier for moving the carrier in a generally arcuate path across the data tracks, the read head and write head being radially offset from one another, the amount of radial offset being related to radial position of the carrier; wherein the write head is aligned with a data track in a zone for writing data to the data islands in said aligned data track when the read head is reading the sync marks in an annular nondata region of said zone.

8. The disk drive of claim 7 wherein the read head and write head are physically spaced apart on the carrier in a generally radial direction.

9. The disk drive of claim 8 wherein the read head is located closer to the inside diameter of the disk than the write head.

10. The disk drive of claim 9 wherein each of the zones has a nondata region only near its ID perimeter.

11. The disk drive of claim 8 wherein the read head is located closer to the outside diameter of the disk than the write head.

12. The disk drive of claim 11 wherein each of the zones has a nondata region only near its OD perimeter.

13. The disk drive of claim 8 wherein each zone has only one annular nondata region and wherein the radial dimension of said one annular nondata region is related to the radial offset associated with that zone.

14. The disk drive according to claim 7 wherein the data islands in each track of a zone are generally equally angularly spaced and wherein each sync mark in a zone comprises a set of generally radially directed marks that have substantially the same angular spacing as the data islands in that zone.

15. A patterned-media magnetic recording disk drive comprising:

a rotatable magnetic recording disk having a plurality of discrete magnetizable data islands, the islands being arranged into a plurality of concentric tracks and the tracks being arranged into a plurality of radially-spaced annular zones, each zone having an inside-diameter (ID) perimeter and an outside-diameter (OD) perimeter and only one annular nondata region near one of its perimeters, and sync marks in each zone and extending generally radially from the zone ID perimeter to the zone OD perimeter so as to extend into said at least one annular nondata region;

a read head for reading data from the data islands;

a write head for writing data to the data islands;

carrier supporting the read head and write head, the read head and write head being physically spaced apart on the carrier in a generally radial direction; and a rotary actuator attached to the carrier for moving the carrier in a generally arcuate path across the data tracks, the read head and write head being radially offset from one another, the amount of radial offset being related to radial position of the carrier; and wherein the radial dimension of said one annular nondata region in each zone is related to the radial offset associated with that zone.

16. The disk drive of claim 15 wherein the read head is located closer to the inside diameter of the disk than the write head.

17. The disk drive of claim 16 wherein the one annular nondata region in each zone is near the ID perimeter of the zone.

18. The disk drive of claim 15 wherein the read head is located closer to the outside diameter of the disk than the write head.

19. The disk drive of claim 18 wherein the one annular nondata region in each zone is near the OD perimeter of the zone.

* * * * *